United States Patent [19]

Hein et al.

[11] Patent Number: 5,415,059
[45] Date of Patent: May 16, 1995

[54] TURF MACHINE LOCKABLE BRAKE MECHANISM

[75] Inventors: Steven L. Hein, Jefferson; Mark J. Wegner, Watertown, both of Wis.

[73] Assignee: Ransomes American Corporation, Lincoln, Nebr.

[21] Appl. No.: 105,028

[22] Filed: Aug. 11, 1993

[51] Int. Cl.[6] .................... A01D 34/82; G05G 5/06
[52] U.S. Cl. ........................ 74/529; 56/11.3; 74/527; 192/11
[58] Field of Search ............ 74/529, 527; 192/11; 56/11.3, 11.6

[56] References Cited

U.S. PATENT DOCUMENTS

| | | | |
|---|---|---|---|
| 2,601,752 | 7/1952 | Rose . | |
| 3,616,869 | 11/1971 | Rilling . | |
| 4,885,903 | 12/1989 | Scag . | |
| 4,967,543 | 11/1990 | Scag et al. . | |
| 4,991,382 | 2/1991 | Scag . | |
| 5,146,735 | 9/1992 | McDonner | 192/11 X |
| 5,155,985 | 10/1992 | Oshima et al. | 56/11.3 X |
| 5,197,577 | 3/1993 | Hayek | 56/11.3 X |

OTHER PUBLICATIONS

Ransomes/Bob-Cat Variable Speed Mid-Size Parts Manual Commercial Mower, P/N 38492C Dec. 1992, Cover and pp. 14–15.
Ransomes/Bob-Cat Variable Speed Mid-Size Operators Manual Commercial Mower, P/N 38488 Feb. 1992, Cover and pp. 8, 18–19.
Ransomes/Bob-Cat Gear Drive Mid-Size Operators Manual Commercial Mower, P/N 38411, Rev. A Jan. 1992, Cover and pp. 9 and 19.
Ransomes/Bob-Cat Pos-A-Drive Mid-Size Parts Manual Commercial Mower, P/N 38493 Apr. 1992, Cover and pp. 10–11.

*Primary Examiner*—Rodney H. Bonck
*Attorney, Agent, or Firm*—Harness, Dickey & Pierce

[57] ABSTRACT

An improved double-roller traction lever lock mechanism is provided which allows for operator positioning of the turf machine traction levers in a locked brake position in addition to a neutral or drive position. Positioning of the traction levers in the brake, neutral or drive positions is assured through the use two rolling element bearings associated with a traction lever lock plate to provide positive operator noticeable detent. In the drive position, the traction levers may be freely moved to operate the turf machine in either drive, neutral or brake at the operator's command.

17 Claims, 4 Drawing Sheets

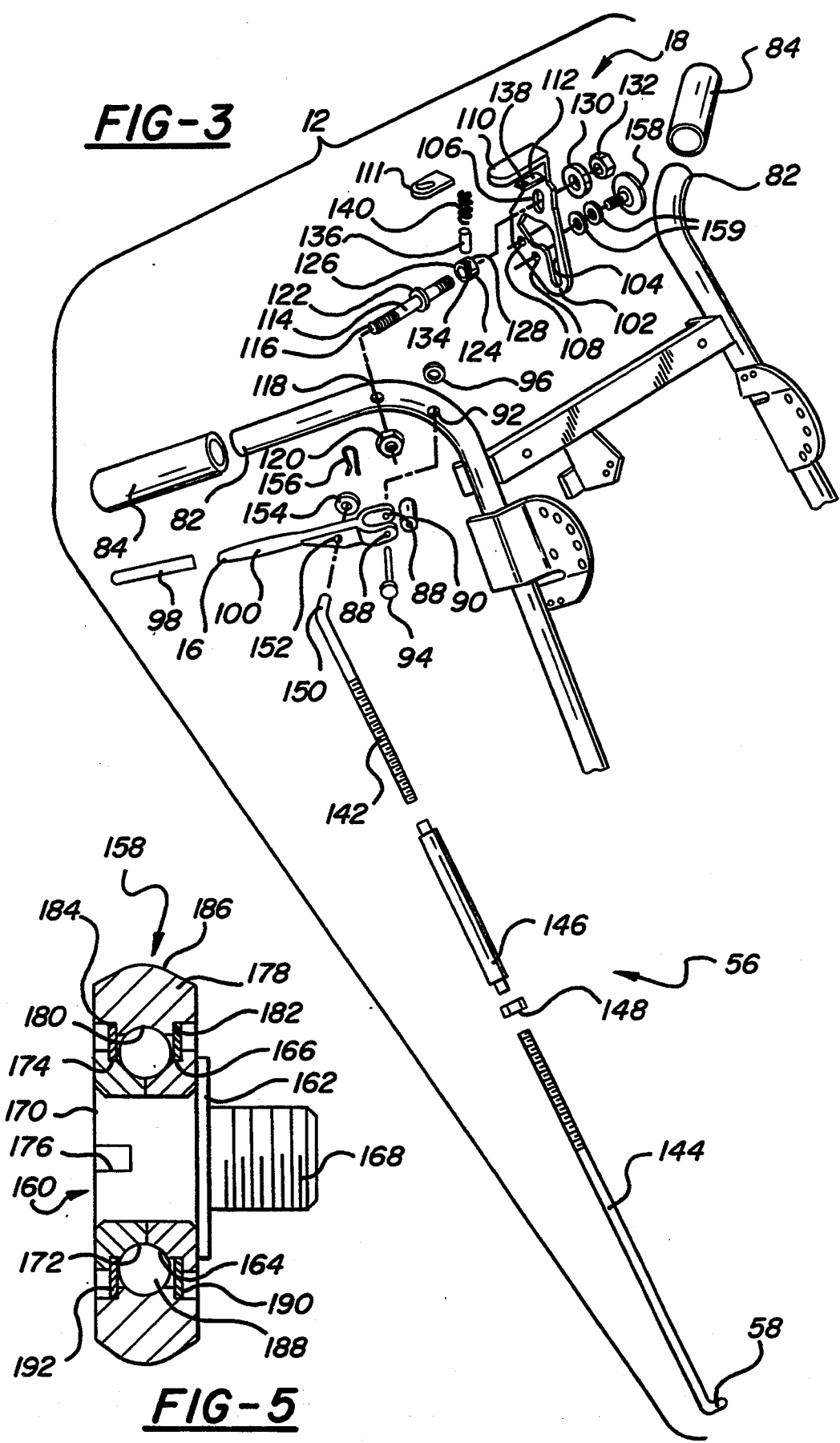

TURF MACHINE LOCKABLE BRAKE MECHANISM

BACKGROUND AND SUMMARY OF THE INVENTION

This invention relates generally to turf care equipment, and more particularly, to a lockable brake for a turf machine having a roller latch mechanism for operating the drive engaging mechanism of a turf cutting machine and for locking the brakes in an applied position.

Many pieces of turf equipment (including but not limited to residential lawn mowers and particularly larger commercial turf care machines) are equipped with drive mechanisms for providing power driving operation. Such machines generally include a clutch mechanism which may be engaged by the operator to transfer driving torque from a source of power, usually an internal combustion engine, to one or more drive wheels. Hence, these machines also include, often in the form of levers or actuators, operator manipulatable controls for engaging the drive mechanism. These levers are typically called traction levers. Traction lever locks may also be provided, the traction lever locks having detent positions for maintaining the traction lever in the neutral or drive position.

Turf machines also often include brakes, and in some arrangements, these brakes are actuated through further manipulation of the traction levers. Selective transient application of the brakes assists the operator in maneuvering the turf machine. However, when transporting the machine, usually by loading the machine onto a trailer or into the back of a truck, it is desirable to fix the brake such that the brake remains engaged to help prevent the machine from moving within the truck or trailer. Also, when operating the machine on a hill or grade, it is again desirable to be able to fix the brake, particularly when the machine is not in operation, such that it does not roll away.

As can be appreciated, turf machine operators have attempted a number of solutions to the above described problem. Some of these include providing chocks against the wheels of the machine, turning the machine sideways to the hill, or leaving the machine in gear with the engine off. These solutions are undesirable and inconvenient. Adding a separate latch or other mechanism to lock the turf machine brakes is also undesirable as this increases the cost of the turf machine by adding parts and assembly steps. Separate latch mechanisms may also encourage non-use by requiring the operator to perform functions not associated with normal turf machine operation.

Thus, it is an object of the apparatus of the present invention to provide a locking brake mechanism which is integral to the traction lever locks presently incorporated on turf machines.

It is a further object of the apparatus of the present invention to provide an improved traction lever lock mechanism which allows for operator positioning of the turf machine traction levers in a locked brake position in addition to neutral or drive positions. Positioning of the traction levers in the brake, neutral or drive positions is assured through the use of two rolling element bearings associated with a traction lever lock plate to provide a positive operator noticeable detent. In the drive position, the traction levers may be freely moved to operate the turf machine in either drive, neutral or brake at the operator's command.

BRIEF DESCRIPTION OF THE DRAWINGS

These and other advantages, objects and features of the present invention will become apparent to those skilled in the art by referring to the following written description and drawings in which:

FIG. 3 is an exploded perspective assembly view of the upper handle portion of the turf machine of FIG. 1 further showing the double-roller traction lever lock assembly of the present invention;

FIG. 5 is a sectional view of a roller assembly of the present invention taken along line 5—5 of FIG. 4A.

DETAILED DESCRIPTION OF THE PREFERRED EMBODIMENT

Figure 1:
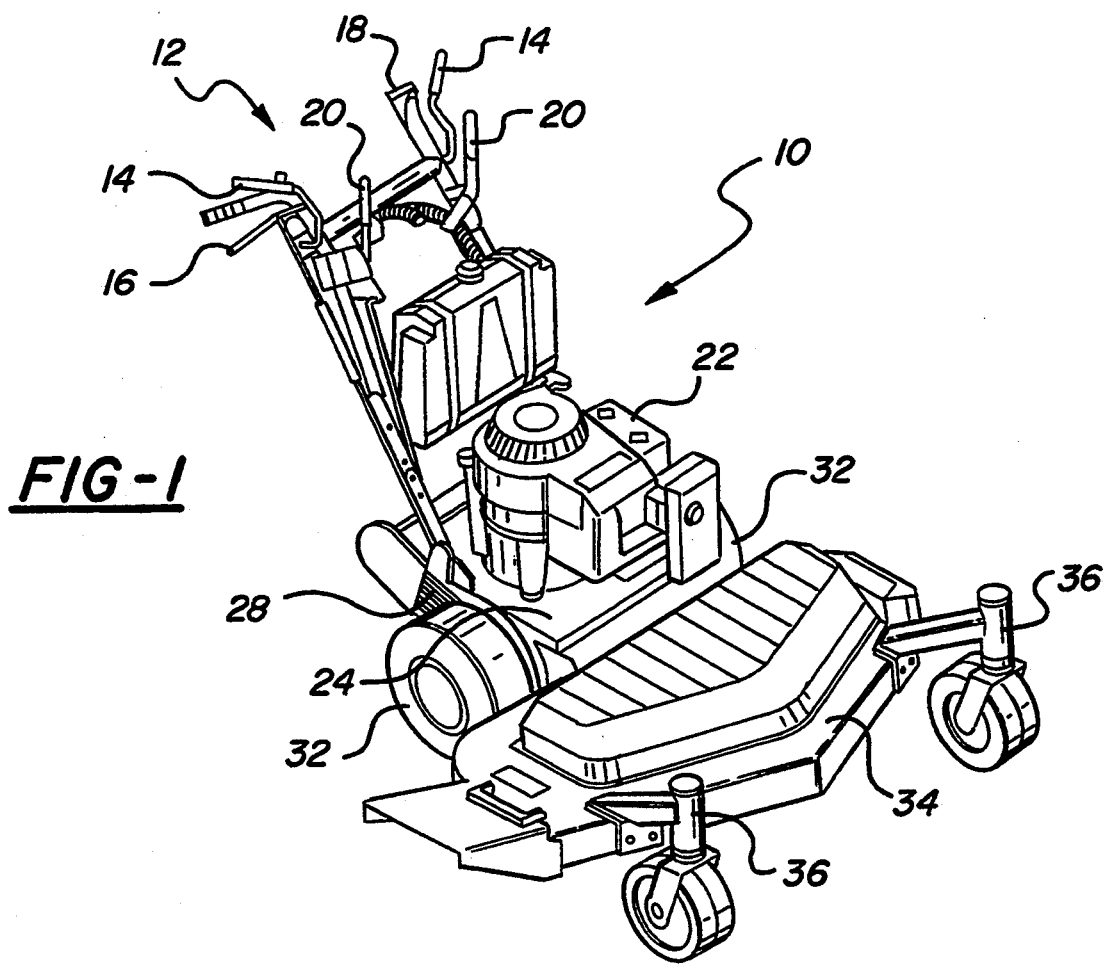
FIG. 1 is a perspective view of a typical walk-behind turf machine which incorporates the double-roller traction lever lock mechanism of the present invention.
Figure 2:
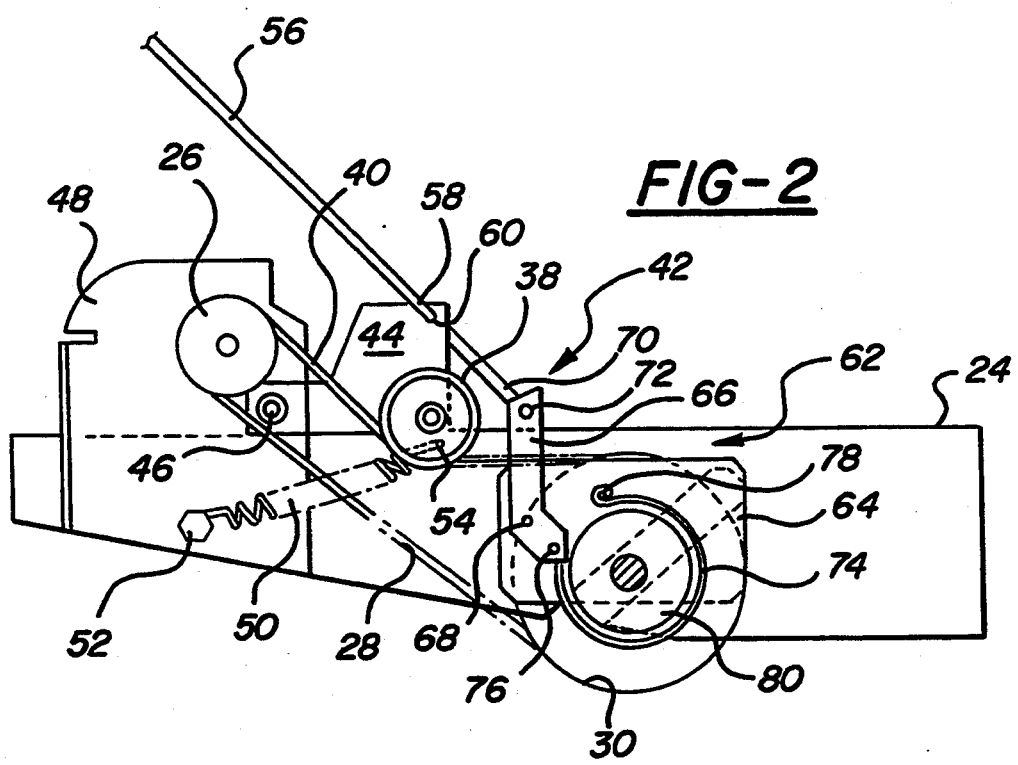
FIG. 2 is a side elevational view of the traction mechanism of the turf machine shown in FIG. 1 with the cover and drive wheel removed to reveal the traction mechanism and the brake assembly.

In general, the preferred embodiment of the present invention employs a double-roller traction lever lock assembly which is adaptable to turf care equipment and particularly to the walk-behind turf cutting machine 10 shown in FIG. 1. The conventional elements of turf machine 10 are fully described in Ransomes/Bob-Cat Parts Manual Commercial Mower, Part No. 38492C (12/1992) a publicly available document, and thus, further description of these conventional elements is not provided. The present invention is being described in a preferred embodiment adapted to a particular drive mechanism of a turf machine. It should be understood and appreciated that the lockable brake of the present invention is adaptable to any number of turf machine drive mechanisms including, but not limited to, multiple-speed transmissions, worm gear drives, hydrostatic drives, various other types of belt drives and the like. With reference then to FIGS. 1 and 2, turf machine 10 includes a handle assembly 12 with associated operator present levers 14, traction levers 16, traction lever lock assemblies 18 and mowing speed and blade engagement levers 20. Turf machine 10 receives power from an internal combustion engine 22 mounted to an engine deck 24 which provides driving torque via a suitable transmission (not shown) through drive pulleys 26, belts 28 and wheel pulleys 30 to drive wheels 32. Driving torque from engine 22 is further coupled through a suitable torque transmission device (not shown) to mower cutting deck 34 for driving one or more cutting blades (not shown). Turf machine 10 is adjustably supported for changing the mowing height of cutting deck 34 on drive wheels 32, and forward caster wheels 36.

Tension in belt 28 between the drive pulley 26 and wheel pulley 30 is maintained for transmitting driving torque therebetween by engagement of idler pulley 38 with the outer surface 40 of belt 28. In the preferred embodiment, a pair of symmetrical traction engagement mechanisms 42 are provided for individually controlling traction to each of a pair of drive wheels 32. For brevity, a single traction engagement mechanism is described as follows.

With particular reference to FIG. 2, traction drive mechanism 42 is shown and includes idler pulley 38 journally mounted to bellcrank 44. Bellcrank 44 is pivotally mounted on mounting pin 46 secured to bracket member 48 by welding or other suitable means with bracket member 48 being secured to engine deck 24 by threaded fasteners (not shown) or other suitable means. Idler pulley 38 is biased into engagement with belt 28 by bias spring 50 engagement with bellcrank tab 54 and bolt 52 secured to engine deck 24. Traction actuator rod 56 is provided and is formed with a bend at its distal end 58 which passes through aperture 60 formed in bellcrank 44. Traction actuator rod 56 is secured through bellcrank aperture 60 by, for example, a cotter pin (not shown). Axial movement of traction actuator rod 56 causes pivoting motion of bellcrank 44 about mounting pin 46 and thus pivots idler pulley 38 away from and out of engagement with belt outer surface 40 such that tension in belt 28 is relieved and driving torque is no longer delivered from drive pulley 26 to wheel pulley 30.

With continued reference to FIG. 2, traction engagement mechanism 42 also includes brake assembly 62. Brake assembly 62 includes brake mounting plate 64 suitably secured to engine deck 24 and braking lever 66 pivotally mounted on mounting pin 68 which is secured to brake mounting plate 64. A brake actuator rod 70 is secured to brake lever 66 by swivel pin 72. Further secured to brake lever 66 is brake band 74 by roll pin 76. Brake band 74 is further secured to brake mounting plate 64 by pin 78 such that brake band 74 surrounds brake drum 80 which is secured to wheel pulleys 30 by a plurality of threaded fasteners (not shown). Brake actuator rod 70 has an aperture (not shown) formed at its second end through which distal end 58 of traction actuator rod 56 is received and secured. As described, traction actuator rod 56 is displaced axially to pivot idler pulley 38 away from belt 28 to disengage the drive mechanism. As will be appreciated, pivoting motion of bellcrank 44 causes substantially axial displacement of brake actuator rod 70 thereby causing a pivoting motion of brake lever 66 and concomitant contraction of brake band 74 about brake drum 80 for generating braking action.

FIG. 3 shows the upper portion of handle assembly 12 is formed with a pair of ergonomically angled operator handles 82 fitted with rubber grips 84. The handle assembly includes a pair of symmetrical traction levers 16 and traction lever lock assemblies 18 associated with each of the operator handles 82 only one set of which is shown in FIG. 3. Traction lever 16 is formed with a U shaped portion 86 which is received about handle 82 and further includes a pair of apertures 88 which align with the ends of an annular roll pin 90 received through aperture 92 formed in handle 82. Traction lever 16 is pivotally mounted to handle 82 by clevis pin 94 received through traction lever apertures 88 and roll pin 90 and secured by retainer 96. A rubber grip member 98 is also provided and disposed about an elongated finger tip grip portion 100 of traction lever 16.

Traction lever lock assembly 18 includes a lock plate 102 formed with a contoured cut-out 104, an elongated aperture 106, two threaded apertures 108, thumb flange 110 fitted with rubber grip 111 and detent spring flange 112. With continued reference to FIG. 3 and further reference to FIG. 4A, traction lock plate 104 is rotatably mounted to handle 82 with aperture 106 disposed about stud member 114. Stud member 114 is formed with threaded end 116 which is received through aperture 118 formed in handle 82 and secured thereto by nut 120. Stud member 114 is further formed with a shoulder portion 122 against which a first end 126 of annular spacer 126 is disposed in abutting engagement. Lock plate 102 is secured to stud member 114 and in abutting engagement with a second end 128 of spacer 124 by washer 130 and nut 132. Spacer 124 is further formed with a radial bore 134 into which roll pin 136 is interferingly received while detent spring flange 112 is formed with an aperture 138 through which roll pin 136 is slideably received. Detent spring 140 is disposed about roll pin 136 and is compressed between spacer 124 and detent spring flange 112 for providing a biasing force and maintaining lock plate 102 in a detent position as will be described.

With further reference to FIG. 3, traction actuator rod 56 is shown to include upper and lower threaded rod portions 142 and 144, respectively, adjustably connected by turnbuckle 146 and jam nut 148. As described above, the distal end 58 of lower threaded rod portion 144 is operably associated with bellcrank 44 for engaging and disengaging the traction drive 42. The distal end 150 of upper threaded rod portion 142 is also formed with a bend which is received through aperture 152 formed in traction lever 16 and traction lock contoured cut-out 104 and secured thereto by washer 154 and cotter pin 156. As can be appreciated, pivoting motion of traction lever 16 causes substantially axial displacement of actuator rod 56 and thus engagement or disengagement of the traction drive mechanism 42 and brake mechanism 70 as described. Moreover, as traction lever 16 is released and allowed to pivot away from handle 82, idler pulley 38 is caused to engage belt 28 due to action of bias spring 50. Likewise, as traction lever 16 is pivoted toward handle 82, idler pulley 38 is caused to disengage belt 28 and thus disengage the traction drive mechanism 42 thus providing a neutral position. Further pivoting of traction lever 16 toward handle 82 causes engagement of the brake mechanism 62 as brake lever 66 is made to pivot, causing brake band 74 to tighten around brake drum 80.

Figure 4A:
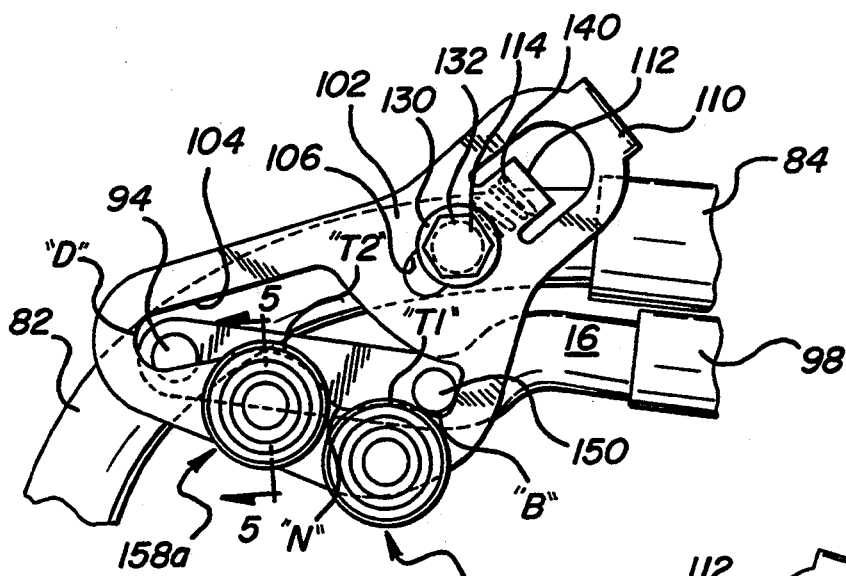
FIG. 4A is a side view of the double-roller traction lever lock assembly of the present invention in the locked brake position.
Figure 4B:
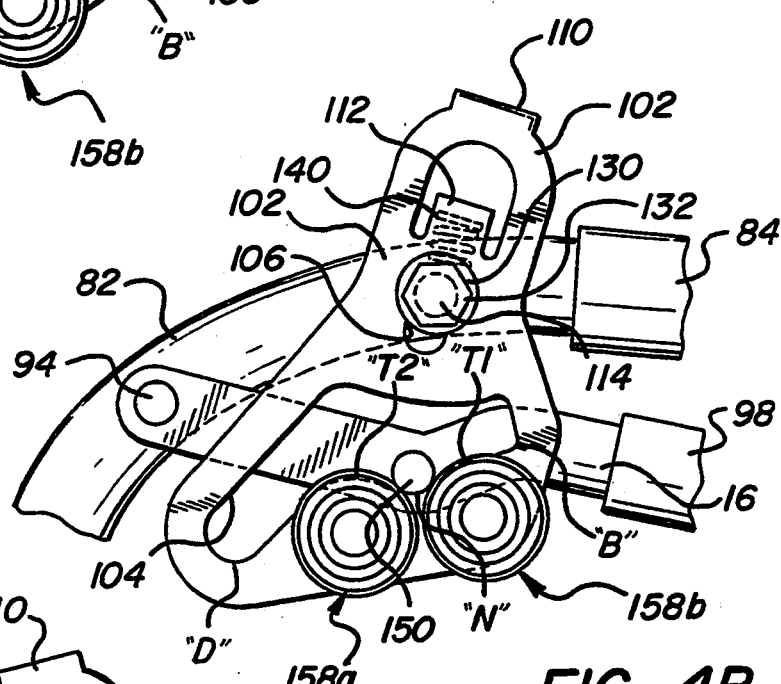
FIG. 4B is a view similar to the view of FIG. 4A with the double-roller traction lever lock assembly positioned in the neutral position.
Figure 4C:
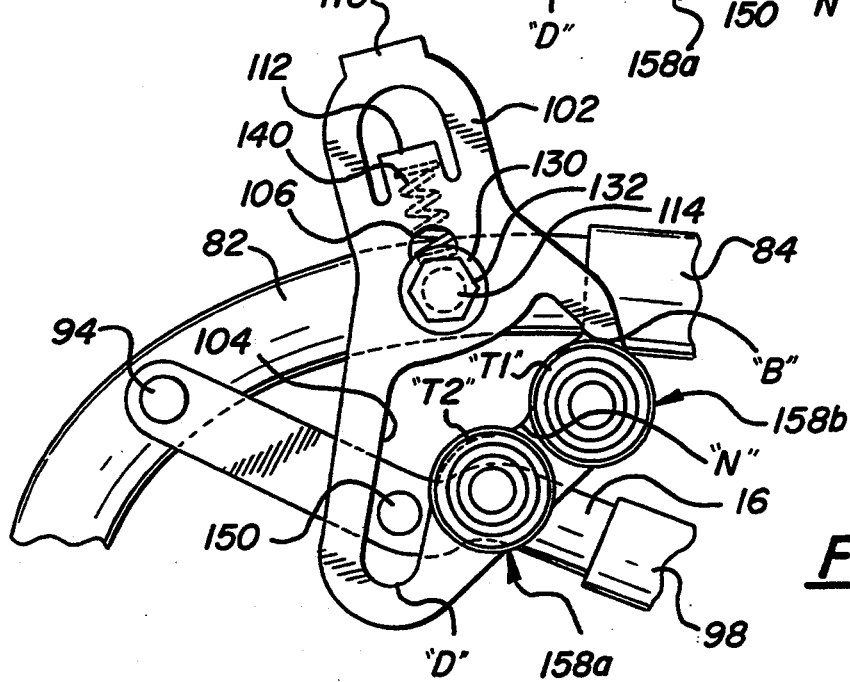
FIG. 4C is a view similar to the view of FIG. 4A with the double-roller traction lever lock assembly positioned in the drive position.

With continued reference to FIG. 3 and particular reference to FIGS. 4A-4C, lock plate contoured cut-out 104 defines detent positions which may be defined brake, neutral and drive positions indicated by reference symbols B, N and D, respectively. Between the brake and neutral detent positions and between the neutral and drive detent positions are transition regions indicated by symbols T1 and T2, respectively.

Secured through threaded apertures 108 formed in lock plate 102 adjacent the transition regions T1 and T2 are rolling element bearing assemblies 158a and 158b. A plurality of spacers 159 are provided and used as required to prevent rolling element bearing assemblies from binding against lock plate 102.

FIG. 5 shows that a typical one of the rolling element bearing assemblies 158 includes a two piece central hub portion 160, the inner hub portion 162 of which is formed with a bearing race surface 164, a seal surface 166 and a protruding threaded stud portion 168. The outer hub portion 170 also includes a bearing race surface 172, seal surface 174 and a slot 176 designed to be engaged by a standard head screw driver. Slot 176 is conveniently provided to assist in installing bearing assemblies 158a and 158b to lock plate 102. Bearing assemblies 158a and 158b also include an outer roller portion 178 which includes an inner race surface 180, inner and outer seal surfaces 182 and 184, respectively, and outer bearing surface 186. Disposed on race surfaces 164, 172 and 180 between hub portion 160 and outer roller portion 178 are a plurality of ball bearings 188. Inner and outer seals 190 and 192, respectively, are further provided for retaining lubrication with and preventing dirt and other contaminants from entering the bearing assemblies 158a and 158b.

As best seen in FIGS. 4A-4C, rolling element bearing assemblies 158a and 158b are mounted on lock plate 102 in close proximity to contoured cut-out 104 transition regions T1 and T2. Moreover, rolling element bearing assemblies 158a and 158b are disposed such that bearing surfaces 186 project into the silhouette of contoured cut-out 104 as shown in FIGS. 4A-4C.

The operation of the lockable brake with roller latch mechanism will now be explained with reference to FIGS. 4A-4C. Starting with the turf machine traction levers in the locked brake position as indicated in FIG. 4A, in order to release the brake, the machine operator maintains a grip on traction lever 16, and depresses thumb flange 110, which compresses detent spring 140 and displaces lock plate 102 relative to upper actuator rod distal end 150, and then rotates lock plate 102 counter-clockwise. As can be seen in FIG. 4B, when the lock plate 102 has been rotated counter-clockwise so that the traction lever 16 is released, actuator rod distal end 150 falls into the neutral detent position. If the operator continues to rotate lock plate 102 counter-clockwise, the traction lever 16 will eventually be released into the drive position as shown in FIG. 4C. To lock the traction drive mechanism 42 in either neutral or brake from drive, the operator squeezes the traction lever 16 toward handle 82, and depresses thumb flange 110 and rotates lock plate 102 to the desired position at which time the pressure on thumb flange 110 and traction lever 16 is released.

If the lock plate 102 is not rotated exactly to either the brake, neutral or drive positions, but is in a transition region, actuator rod distal end 150 will contact rolling element bearing surface 186. Under the combined forces of detent spring 140 and bias spring 50, rolling element bearings 158a and 158b cause the lock plate 102 to pivot such that actuator rod distal end 150 falls positively into the closest of the brake, neutral or drive positions and does not stick or hang-up in a transition region. Further, the brake and drive positions are separated by the neutral position such that the operator may not unintentionally position the turf machine in drive when the brake position is desired. The operator can also feel, through thumb flange 110 and traction levers 16 which way the lock plate is moving and thus correct it if it is not going to the desired position. Detent spring 140 and bias spring 50 further maintain a force on the actuator rod distal end 150 in the locked brake and neutral positions such that the traction lever 16 will not easily slip from the locked brake or neutral detent positions. Thus the operator is assured that the drive mechanism of turf machine 10 is in one of the three operating positions and not in a transition region.

Figure 6A:
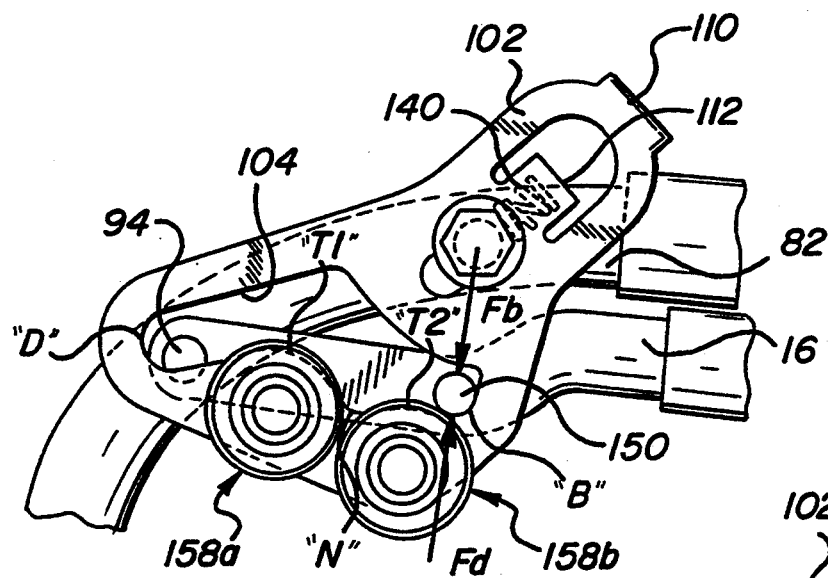
FIG. 6A is a side view of the double-roller traction lever lock assembly of the present invention illustrating the forces maintaining the traction lever in the locked brake position.
Figure 6B:
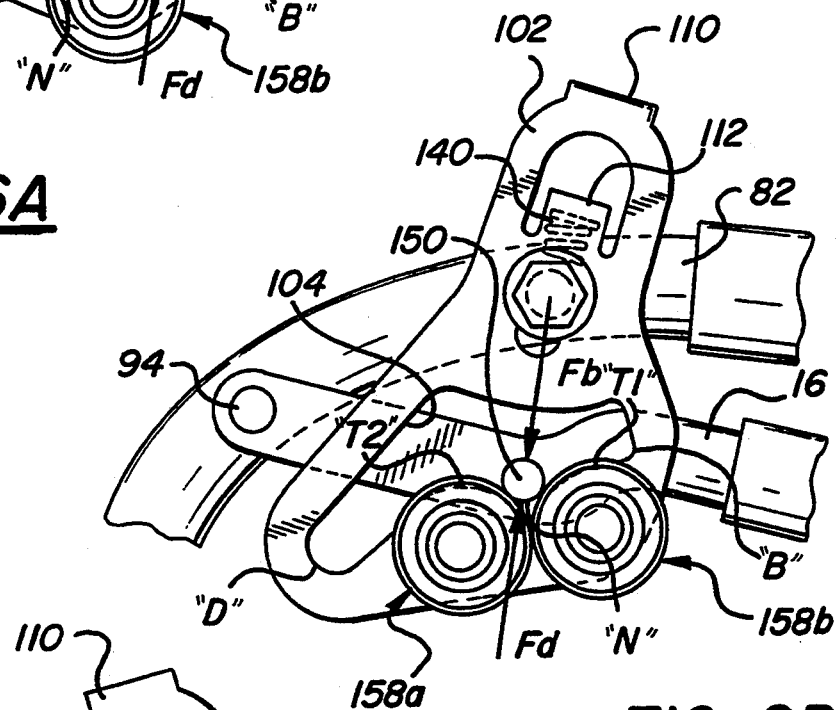
FIG. 6B is a view similar to the view of FIG. 6A illustrating the forces maintaining the traction lever in the neutral position.
Figure 6C:
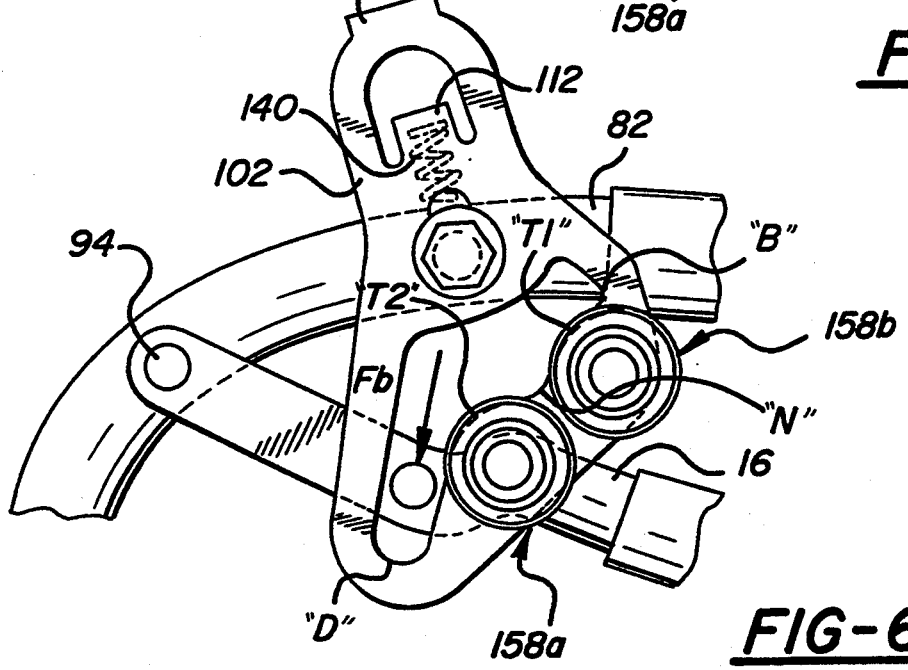
FIG. 6C is a view similar to the view of FIG. 6A illustrating the forces maintaining the traction lever in the drive position.

With reference now to FIGS. 6A-6B, the forces exerted by cooperation of the bias spring 50 and detent spring 140 on actuator rod distal end 150 are illustrated by arrows Fd and Fb indicating detent spring force and bias spring force, respectively. As illustrated in FIG. 6A, bias spring force Fb is substantially axially aligned with actuator rod 56 and acts to urge actuator rod distal end 150 against rolling element bearing 158b while detent spring force Fd urges actuator rod distal end 150 toward the brake detent of contoured cut-out 104. If lock plate 102 is not fully rotated to the brake position but is substantially rotated to the brake position, force Fd will act to assure that actuator rod distal end 150 is moved to the locked brake position thus locking the traction levers 16 in the locked brake position. Referring to FIG. 6B, lock plate 102 is rotated to the neutral position, and force Fb remains substantially axially aligned with actuator rod 56 causing actuator rod distal end 150 to bear against lock plate 102 between rolling element bearings 158a and 158b and the neutral detent position of contoured cut-out 104. Force Fd is now substantially aligned in opposition to force Fb, and thus, forces Fb and Fd are essentially balanced in direction but not magnitude against each other in the neutral position. Small angular rotations of lock plate 102 from the neutral position, however, will create a component of Fd urging actuator rod distal end 150 back towards the neutral position. Thus, if lock plate 102 is not substantially aligned in the neutral position, force Fd will act to urge and maintain traction levers to the neutral position. With reference then to FIG. 6C, lock plate 102 is rotated to the drive position, force Fb remains substantially axially aligned with actuator rod 56 causing actuator rod distal end 150 to move towards the drive detent of contoured cut-out 104 until the belt prevents further rotation of bellcrank and stop axial displacement of rod 56 due to force Fb. Detent spring 140 lifts lock plate 102 when rod 56 is in the drive position, and the lower end of slot 106 contacts the lower side of stud 114. This helps prevent lock assembly 18 from rotating to the neutral or brake positions from drive, unless the operation manually and intentionally rotates the lock assembly with thumb flange 110. To reiterate, the combination of forces from bias spring 50 and detent spring 140 thus cooperate to urge and maintain the traction levers in the detent positions provided by lock plate contoured cut-out 104.

While the above description discusses a preferred embodiment of the present invention, it will be understood that the description is exemplary in nature and is not intended to limit the scope of the invention. The apparatus of the present invention will therefore be understood as susceptible to modification, alteration, and variation by those skilled in the art without deviating from the fair scope of the invention as defined in the following claims.

We claim:

1. In a walk-behind turf machine including a source of power, a plurality of wheels, and a traction drive actuated by operator manipulatable traction levers, a lockable brake mechanism comprising:

brake means including a brake associated with one of the wheels for restricting rotation of the one wheel when the brake is applied;

actuator means including an actuator rod associated with one of the traction levers for selectively applying the brake means to prevent rotation of the one wheel;

lock means comprising a lock plate structure having a lock plate with a contoured cut-out section for defining detent positions for the one traction lever adapted to correspond to brake, neutral and drive operating modes of the turf machine, with the neutral position separating the brake position from the drive position, the lock plate structure including a pair of transition regions, with one such transition region being interposed between adjacent detent positions, the contoured cut-out section having two major portions non-linearly arranged relatively to one another, with one of the two portions having two detent positions along one edge thereof, and when the one traction lever is in the drive position driving torque is coupled between the source of power to the one wheel, and when in the neutral position driving torque is uncoupled between the source of power and the one wheel, and when in the brake position, driving torque is uncoupled between the source of power and the one wheel and the brake means is locked in an applied condition; and biasing means for urging the one traction lever into a nearest one of the brake, neutral, and drive detent positions, with the actuator rod associated with the one traction lever being urged in the direction of the nearest detent position when positioned in a transition region, said biasing means including a plurality of roller bearing means secured to the lock plate and associated with each transition region between the brake, neutral, and drive positions such that the actuator rod engages at least one of the roller bearing means when the lock plate is moved to a transition position, and the actuator rod engages the lock plate when moved to a detent position.

2. The locking mechanism of claim 1 wherein the biasing means further comprises a spring associated with the traction drive.

3. The locking mechanism of claim 2 wherein the biasing means comprises a spring associated with the lock plate.

4. The locking mechanism of claim 3 wherein the lock plate is a one piece plate, and the lock plate is movable between a transition position and a detent position in part by rotational movement of the lock plate about a pivot point.

5. In a turf machine including driven wheels, a source of power and a traction drive controllable from operator manipulatable controls for placing the turf machine in a number of operating modes and for delivering driving torque to the wheels, a brake mechanism comprising:

brakes respectively associated with at least two of the driven wheels for restricting rotation of the wheels;

a plurality of actuators associated with the controls for selectively applying the brakes, associated with each driven wheel, each actuator having an associated rod member which mechanically communicates with at least one of the controls such that movement of the one control causes movement of the associated rod member;

a lock plate structure associated with each actuator for locking the actuator when a respective one of the brakes is applied, the lock plate structure having a contoured first cut-out section for defining detent positions for a selected one of the traction levers adapted to correspond to brake, neutral, and drive operating modes of a respective driven wheel of the turf machine, the neutral position separating the brake position from the drive position, the lock plate structure including a pair of transition regions with one such transition region interposed between adjacent detent positions, and wherein in the drive position driving torque is coupled between the source of power and the respective driven wheel, in the neutral position driving torque is uncoupled between the source of power and the respective driven wheel, and in the brake position, driving torque is uncoupled between the source of power and the respective driven wheel and the respective brake is locked in an applied condition, the lock plate having an arcuate shaped second cut-out section with a center portion of the cut-out section projecting away from the lock plate and defining a tab, the lock plate being pivotable about a fixed member and having an elongated third, cut-out section associated with the fixed member which enables translational movement of the lock plate relative to the fixed member; and biasing means associated with each lock plate structure and cooperating with the lock plate tab for urging the traction lever into the brake, neutral, and drive detent positions such that the actuator rod member is urged in the direction of the nearest detent position when positioned in a transition region, said biasing means including roller means secured to the lock plate and associated with each transition region between the brake, neutral and drive positions such that an actuator rod member for operating one of the traction levers engages the roller means when the lock plate is moved to a transition position, and the actuator rod member engages the lock plate when moved to a detent position.

6. The brake mechanism of claim 5 wherein the brake actuator and lock plate structure are associated with the operator manipulatable controls.

7. The brake mechanism of claim 6 wherein the lock plate structure includes a one piece plate with the first, second and third cut-out sections formed therein.

8. The brake mechanism of claim 7 wherein the biasing means further includes a spring associated with the lock plate.

9. The brake mechanism of claim 7 wherein the biasing means further includes a spring associated with the controls.

10. A lockable brake mechanism for a turf machine having a plurality of traction levers and a plurality of wheels with at least one wheel having an associated brake comprising:

brake means associated with one of the wheels and including a brake for restricting rotation of the one wheel when applied;

actuator means including an actuator for selectively applying the brake means to prevent rotation of the one wheel;

operator actuatable lock means, associated with one of the traction levers, for selectively locking the brake means with the brake in the applied position such that the brake is held in the applied position without additional operator effort, the lock means comprising a lock plate having a contoured cut-out section for defining detent positions for associated traction lever adapted to correspond to brake, neutral and drive operating modes of the one wheel of the turf machine, the neutral position separating the brake position from the drive position, and between which positions are interposed transition regions with one such transition region being interposed between adjacent detent positions, and wherein, when the associated traction lever is in the drive position driving torque is coupled between the source of power and the one wheel and when in the neutral position, driving torque is uncoupled between the source of power and the one wheel, and when in the brake position, driving torque is uncoupled between the source of power and the end wheel, and the brake means is locked with the brake in an applied condition; and biasing means for urging the associated traction lever into the brake, neutral or drive detent position, with the actuator being urged in the direction of the nearest detent position when positioned in a transition region, the biasing means including a pair of roller means supported by the lock plate, with each roller means being associated with a particular transition region between the brake, neutral and drive positions such that the actuator engages one of the roller means when the lock plate is moved to a transition position, and the actuator engages the lock plate when moved to a detent position, with each of the roller means being in close proximity to one other and their respective detent positions, whereby contact with the actuator in the transition regions is ensured.

11. The brake mechanism of claim 10 wherein the lock plate is hand actuated.

12. The brake mechanism of claim 11 wherein the lock means is hand positionable to select neutral and drive positions.

13. The brake mechanism of claim 11 wherein the biasing means comprises at least one spring for urging the actuator and the lock means into the brake position.

14. The brake mechanism of claim 10 wherein the brake mechanism is integral with the neutral and drive controls of the one wheel of the turf machine.

15. The brake mechanism of claim 14 wherein the lock plate is a one piece plate.

16. The brake mechanism of claim 10 wherein: the turf machine is a walk-behind turf machine having at least two driven wheels each having a brake.

17. The brake mechanism of claim 16 wherein the lock plate is hand actuated.

* * * * *

UNITED STATES PATENT AND TRADEMARK OFFICE
CERTIFICATE OF CORRECTION

PATENT NO. : 5,415,059
DATED : May 16, 1995
INVENTOR(S) : Hein, Steven L. et al.

It is certified that error appears in the above-indentified patent and that said Letters Patent is hereby corrected as shown below:

Title Page, item [73] Assignee, replace "American" with --America--.

Title Page, item [57] Abstract, after "use" insert --of--.

In the Claims

Column 9, line 7, Claim 10, after second occurrence of the word "for" insert --the--.

Col. 9, line 22, Claim 10, replace "end" with --one--.

Signed and Sealed this

Fifth Day of December, 1995

Attest:

BRUCE LEHMAN

*Attesting Officer*    *Commissioner of Patents and Trademarks*